June 8, 1965 D. B. STOLTZFUS 3,187,720
ELECTRIC BARRIER TYPE STOCK FEEDER ACCESS CONTROL
Filed Oct. 25, 1963 2 Sheets-Sheet 1
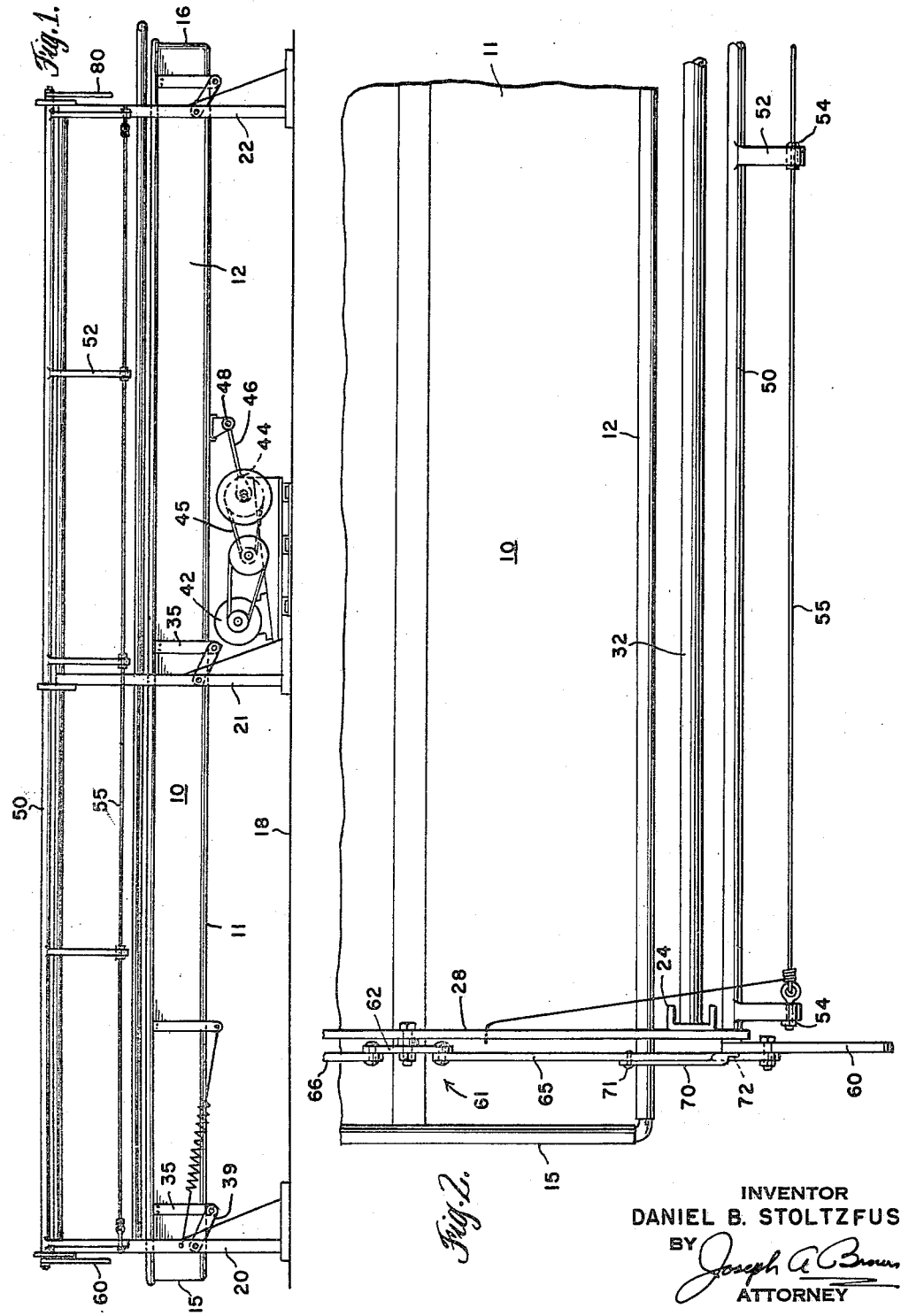
INVENTOR
DANIEL B. STOLTZFUS
BY
ATTORNEY

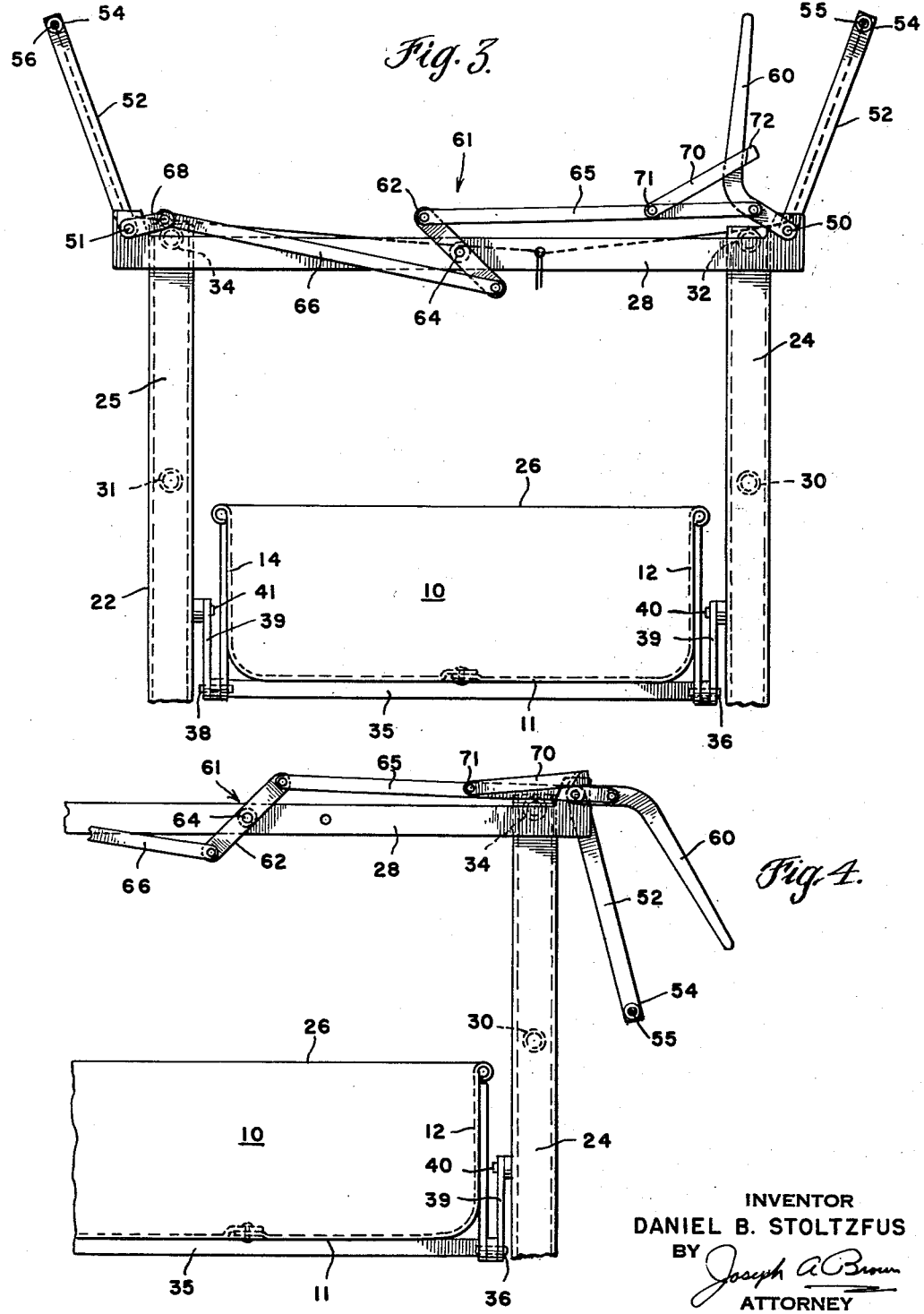

United States Patent Office 3,187,720
Patented June 8, 1965

3,187,720
ELECTRIC BARRIER TYPE STOCK FEEDER
ACCESS CONTROL
Daniel B. Stoltzfus, Kinzers, Pa., assignor to Sperry Rand Corporation, New Holland, Pa., a corporation of Delaware
Filed Oct. 25, 1963, Ser. No. 318,990
7 Claims. (Cl. 119—63)

This invention relates to devices for delivering hay, silage and other feeds to stock animals.

In the feeding of stock animals such as steers, it has been found that the animals gain more weight with less total feed when multiple limited feeding is practiced. Under this procedure, the animals are fed more frequently and the total ration per day is moderately less than the animals can eat. This keeps the stock in a hungry condition so that they will eat all of the feed presented to them at each feeding. Wasting of feed is eliminated and efficient stock production results.

Multiple limited feeding is not practical if manual labor is employed to feed the animals. Mechanical apparatus is essential. Further, since the animals are fed less than full feed, controlled access to the feed must be provided. It is important that the feed become accessible to all animals at the same time.

In Patent No. 3,092,077 there is disclosed a stock feeder which comprises an elongated feed trough. The trough is supported for vibration in a longitudinal direction whereby feed deposited in one end of the trough will be reciprocated and conveyed toward the opposite end. In such feeder, the trough constitutes the conveying means as well as the receptacle from which the animals feed. Since the feed is deposited in one end of the trough and conveyed toward the opposite end multiple limited feeding can only be properly practiced if there is controlled access to the feed trough. In the absence of access control, the animals will crowd around the end of the feeder which obtains the feed first. The excitement and crowding will affect the metabolism of the animals and affect their weight gains.

One object of this invention is to provide control means useable with a stock feeder and adapted to be positioned in a first location to prevent access of animals to feed and to be moved therefrom to a second location to enable free feed access.

Another object of this invention is to provide access control means particularly adapted for use with a stock feeder of the type shown in the mentioned patent.

Another object of this invention is to provide simple means for controlling access to a feed trough and easily moved between two control locations.

A further object of this invention is to provide a simple unitary structure which will control access to a feed trough from both sides thereof, the arrangement being such that when the animals are prevented from having access to the trough from one side, they are simultaneously prevented from access from the opposite side.

A still further object of this invention is to provide a structure which will achieve the foregoing advantages with an arrangement which is inexpensive to manufacture, install and repair.

Other objects of this invention will be apparent hereinafter from the specification and from the recital in the appended claims.

In the drawings:
FIG. 1 is a side elevation of a stock feeder having access control means constructed according to this invention, such means being shown in position to prevent animals from reaching the feeder;

FIG. 2 is an enlarged fragmentary plan view of the left end portion of FIG. 1;

FIG. 3 is an enlarged end view looking from left to right in FIG. 1 but showing the access control means in retracted position; and FIG. 4 is a fragmentary view similar to FIG. 3 but showing the control means in lowered operative position corresponding to FIGS. 1 and 2.

Referring now to the drawings by numerals of reference, and particularly to FIG. 1, 10 denotes a feed trough having a bottom wall 11, spaced longitudinal side walls 12 and 14 and end walls 15 and 16. Trough 10 extends horizontally and it is supported above the ground 18 by spaced support stands 20, 21 and 22. Support stand 20 is adjacent end wall 15 of trough 10 and stand 22 is adjacent end wall 16. Support 21 is approximately medially located relative to the trough. As shown in FIG. 3, each support stand comprises a pair of upright frame members 24 and 25, one adjacent side wall 12 of the trough and the other adjacent side wall 14. These frame members extend above the top edge 26 of trough 10 and they are interconnected by a transverse brace 28.

The respective supports are connected to each other by a pair of lower rails 30 and 31 and a pair of upper rails 32 and 34. The lower rails 30 and 31 are spaced slightly above and laterally outwardly of the upper edge 26 of trough 10. The upper rails 32 and 34 are substantially spaced from the lower rails to provide a space through which the animals may project their heads to feed from the trough.

At each support stand, trough 10 is cradled in a U-shaped bracket 35 providing pivot pins 36 and 38 for mounting links 39. There are two links 39 at each bracket 35 and extending from the respective pivot pins 36 and 38 to pivot pins 40 and 41 on the upright members 24 and 25, respectively, of the support stands. The links 39 carry trough 10 for longitudinal vibratory movement relative to the ground 18.

Beneath trough 10 is a motor 42 which drives an eccentric 44 through power train 45. As eccentric 44 rotates, it reiprocates a rod 46 connected at 48 to the bottom 11 of trough 10. As rod 46 is reciprocated, the trough 10 in its entirety is longitudinally vibrated. When feed is deposited in one end of trough 10, it is conveyed by the vibrations longitudinally and toward the opposite end of the trough. With the links positioned as shown, feed deposited in the end 16 is conveyed toward end wall 15.

To prevent crowding of animals around the feeder when a feeding operation begins, access control means is provided and comprising a pair of rockshafts 50 and 51 carried on the transverse brace members 28 of the respective support stands. The rockshafts 50 and 51 are substantially vertically spaced from the trough 10 and extend parallel thereto. The rockshaft 50 is in a vertical plane adjacent side wall 12 of trough 10, while the shaft 51 is in a vertical plane adjacent side wall 14. Each shaft has a plurality of relatively spaced radially outwardly extending support arms 52 which carry insulator sleeves 54 at their outer radial ends. The arms on rockshaft 50 carry an electric shock wire 55 while the arms of rockshaft 51 carry a shock wire 56. In FIGS. 1, 2 and 4, the wires are shown in lowered position and in FIG. 3 elevated. When located in lowered position, each wire is situated outwardly of one side of the trough and in a horizontal plane adjacent the lower side rails 30 and 31. When in such position, animals are prevented from having access to feed in trough 10. However, when the wires are in elevated position as shown in FIG. 3, free access to the feed in the trough 10 is permitted.

To rotate the rockshafts 50 and 51, the end of rockshaft 50 adjacent support 20 is provided with an L-shaped handle 60. Handle 60 is integral with shaft 50 whereby when the handle is swung from the position shown in FIG. 3 to the position shown in FIG. 4, the arms 52 on rockshaft 50 swing downwardly to move wire 55 to a lowered position. Such movement of handle 60 is transmitted to rockshaft 51 so that when wire 55 is positioned, wire 56 is simultaneously and correspondingly located. This is achieved as shown best in FIGS. 3 and 4 by link means 61 including a rocker arm 62 pivoted at 64 on transverse brace member 28. The rocker arm is connected by a first link 65 to handle 60 and by a second link 66 to a lever arm 68 integral with rockshaft 51. As handle 60 is pivoted in a clockwise direction from the position shown in FIG. 3 to the position shown in in FIG. 4, link 65 is moved longitudinally toward the right and rocker 62 is pivoted in a clockwise direction. This causes link 66 to be shifted longitudinally toward the left and the lever arm 68 is swung to cause the rockshaft 51 to be pivoted in a counterclockwise direction. Thus wires 55 and 56 are moved together.

To hold the wires in elevated, retracted position, link 65 carries a latch 70 pivotally connected to the link at 71. Latch 70 has a detent finger at 72 to engage handle 60.

At the end of the feeder adjacent support 22, a handle 80 is fixedly connected to the opposite end of rockshaft 50 and a similar link means is provided to the adjacent end of rockshaft 51. In this way, the electric wires can be lowered or elevated from either end of the feeder. At end wall 15, handle 60 is used; at end wall 16, handle 80 is employed.

When feed is being deposited in one end of the feed trough 19 and reciprocated and conveyed longitudinally in the trough, the electric shock wires are positioned in lowered locations as shown in FIGS. 1, 2 and 4 to keep the animals from the feeder. After the feed has been conveyed and distributed, the motor 42 is shut off and the wires 55 and 56 are moved to elevated locations as shown in FIG. 3 to enable free access to the feed and the trough. In this way, animal crowding is prevented, all of the animals being given simultaneous access and an equal opportunity to feed.

In the drawings the source of the electric power to the shock wires 55 and 56 is not shown. The arrangement is conventional and as used in farm fences to control animals. The shock obtained on touching the wire is of high voltage and very short duration.

The structure described is simple in design whereby it may be manufactured and assembled at very low cost. The farm operator has complete control over the animals as to when they will be able to feed from the trough 10 and such control is easily operated.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A livestock feeder comprising, in combination, a support frame, an elongated trough carried on said frame and shiftable in its entirety longitudinally relative thereto, means for vibrating said trough longitudinally whereby feed deposited in one end of the trough is conveyed toward the opposite end thereof, said trough having a bottom wall and a pair of upright spaced longitudinal side walls over which stock animals may have access to feed in the trough, and means to control access of the livestock to the trough, said access control means comprising a pair of rockshafts carried on said frame and extending generally parallel to said trough, one of said rockshafts being in a vertical plane adjacent one of said trough side walls and the other rockshaft being in a vertical plane adjacent the other trough side wall, each rockshaft having a plurality of relatively spaced radially extending arms, a pair of electric shock wires, one along each side of said trough, one of said shock wires being carried on the arms of said one rockshaft and the other wire on the arms of the other rockshaft, and means for pivoting said rockshafts to swing said arms and move said wires from first locations blocking access to said trough to second remote locations permitting free access, whereby stock animals may be kept away from said trough while feed is being conveyed therein and allowed to feed from the trough when the conveyance is completed.

2. A livestock feeder as recited in claim 1 wherein each rockshaft is substantially vertically spaced from said trough side walls and providing a space between which the animals may extend their heads to feed, said shock wires when in said first locations being in lower horizontal plane adjacent said trough and blocking access to the trough through the feed spaces, said wires when moved to said second location being swung vertically upwardly and above the feed spaces.

3. A livestock feeder as recited in claim 1 wherein said pair of rockshafts are interconnected whereby when one rockshaft is pivoted by said pivoting means the other rockshaft is simultaneously and correspondingly pivoted.

4. A livestock feeder as recited in claim 1 wherein latch means is provided for locking said rockshafts when said wires are in said second locations.

5. A livestock feeder as recited in claim 1 wherein said pivoting means comprises a handle pivotally mounted on said frame and fixedly connected to said one rockshaft, and link means connecting said handle to the other rockshaft whereby when the handle is swung to pivot said one rockshaft, the other rockshaft is also pivoted.

6. A livestock feeder as recited in claim 5 wherein a latch is carried on said link means and engageable with said handle to lock said rockshafts with the wires in said second locations.

7. A livestock feeder as recited in claim 5 wherein said handle is connected to one end of said one rockshaft, a second handle and link means being provided at the opposite end of the one rockshaft whereby the location of said wires can be controlled at either end of said trough.

References Cited by the Examiner
UNITED STATES PATENTS

| | | | |
|---|---|---|---|
| 2,113,741 | 4/38 | Peterson | 119—99 |
| 2,708,901 | 5/55 | Adams | 119—52 |
| 3,010,429 | 11/61 | Grissom | 119—98 |
| 3,033,163 | 5/62 | Hostetler et al. | 119—52 |
| 3,092,077 | 6/63 | Smoker et al. | 119—52 |
| 3,112,731 | 12/63 | Lako et al. | 119—51 |

SAMUEL KOREN, *Primary Examiner.*

ALDRICH F. MEDBERY, *Examiner.*